Dec. 12, 1944.  F. E. JOHNSON  2,365,137
NUT INSTALLATION FOR BLIND FASTENINGS
Filed Dec. 21, 1942
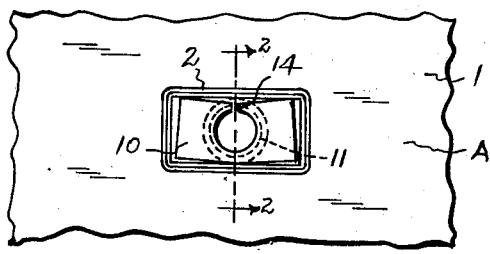
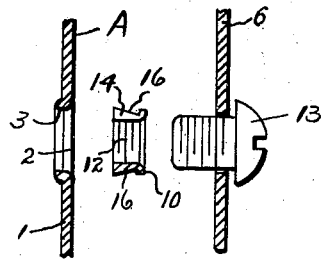
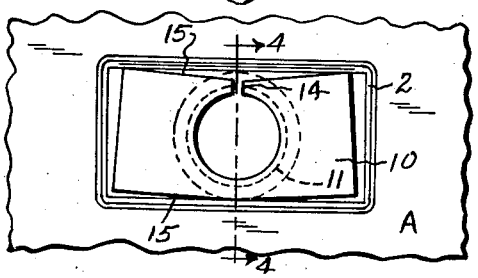
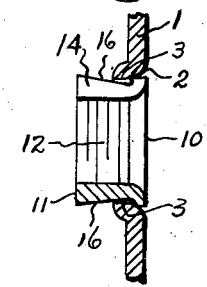
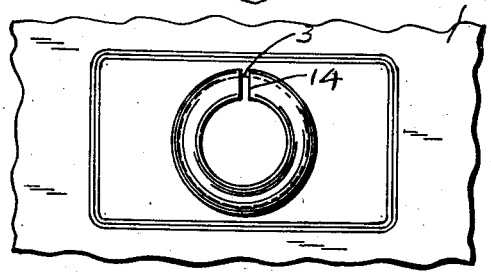
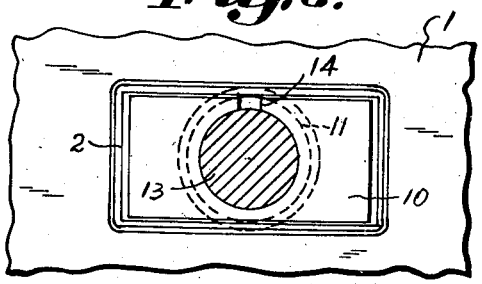
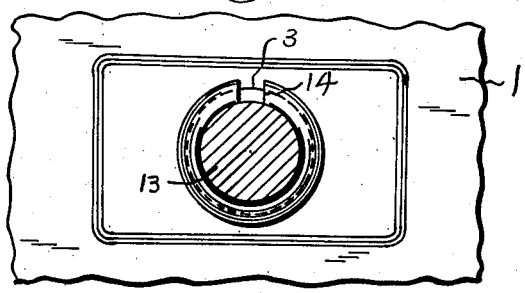
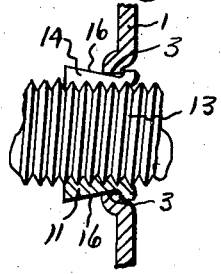
Inventor
Frank E. Johnson.
By Walter S. Jones
Attorney Patented Dec. 12, 1944

2,365,137

UNITED STATES PATENT OFFICE 2,365,137

NUT INSTALLATION FOR BLIND FASTENINGS

Frank E. Johnson, Malden, Mass., assignor to United-Carr Fastener Corporation, Cambridge, Mass., a corporation of Massachusetts Application December 21, 1942, Serial No. 469,656

3 Claims. (Cl. 85—32)

The present invention relates to nut installations for blind fastenings, such as those employed with a supporting member which is accessible from only one side, and the nut, as well as the supported member and screw, must be assembled from said accessible side.

One of the primary objects of the present invention is to improve such nut installations generally by the provision of an improved and simplified nut member that may readily be snapped into engagement with the apertured support and which will effect a secure engagement with the support when the screw or bolt is threaded into the nut.

Illustrative of the invention, reference is made to the accompanying drawing of one embodiment thereof, and wherein:

Fig. 1 is a plan view of a portion of the supporting plate with my improved nut member applied thereto;

Fig. 2 is a vertical sectional view of my improved installation illustrating the parts prior to assembly;

Fig. 3 is an enlarged plan view similar to Fig. 1 of the nut member applied to the support;

Fig. 4 is a sectional view taken on the line 4—4 of Fig. 3;

Fig. 5 is a plan view similar to Fig. 3 but viewed from the opposite side of the support; and Figs. 6, 7 and 8 are views similar to Figs. 3, 4 and 5 respectively, and illustrating the locked position of the nut when the screw has been inserted therein.

Referring to the drawing, the support 1 may be any desired part, but is herein illustrated as a plate of relatively thin sheet material having only one accessible side A. The support is provided with non-circular recess 2 in the accessible face A thereof and a central circular aperture 3 of predetermined size for the reception of a nut of the invention.

The nut member is preferably formed from a thin sheet metal blank preferably of elongated non-circular shape, for example a rectangular blank, having a base 10 and an integral tubular metal barrel or sleeve 11 drawn from the body of the blank. The barrel 11 is drawn to a desired diameter and has a threaded bore 12 for the reception of a threaded screw or bolt 13 to be used with the nut. The base 10 is gapped or slotted midway of one longitudinal side as at 14, said slot extending inwardly to the threaded bore 12 and extending through the barrel 11 at one side only.

The nut member may then be distorted or squeezed together in the plane of the base 10, partially closing the gap or slot 14 and slightly curving the opposite longitudinal edges of the base as indicated at 15 in Fig. 3. The nut is thus tensioned to maintain the gapped barrel in closed position and the bore of the barrel portion 11 thereof is thus of slightly less diameter than the screw.

The barrel 11 projects from the rear face of the nut base 10 to a distance slightly greater than the thickness of the support 1, and the outer peripheral face thereof is bevelled or undercut as at 16, to provide a recessed portion for snap fastener engagement with the wall surrounding the aperture 3 in the support 1. Preferably the diameter of the outer face of the barrel at its free end, when contracted, is approximately equal to the diameter of the aperture 3 so that the barrel may be snapped therein.

Contraction of the barrel 11 as above described reduces its diameter to permit it to be snapped into the aperture, and provides a tapped opening smaller than the diameter of the threaded screw for which the nut was intended. Accordingly, with the nut in place in the support as described above and as illustrated in Figs. 4, 3, and 5, the screw may be threaded into the tapped opening of the barrel, expanding the split barrel and causing the undercut peripheral face to grip the wall around the support aperture 3. The nut is thus locked in the support against axial withdrawal.

Threading of the screw or bolt into the restricted tapped bore as above described, and the consequent expanding of the barrel places the portions of the tapped bore on opposite sides of the gap 14, under tension providing a friction grip against the threaded screw tending to resist rotation of the screw in unthreading direction. This expansion of the barrel 11 also tends to straighten out the longitudinal side edges 15 of the nut base 10.

The recessing of a portion 2 of the support 1 surrounding the aperture 3 provides a seat or recess for the nut base 10 so that the outer face of the nut base will not extend beyond the accessible side A of the support 1. The rectangular shape of the recess 2 and nut base 10 also prevents the nut from turning during the threading or unthreading operation.

From the above it will be apparent that the invention provides an extremely simple and efficient nut construction. By reason of the fact that the nut barrel 11 is associated with a split base, which is somewhat resilient and normally contracted to its minimum diameter, it is permitted to be readily snapped into the aperture 3 of the support 1 from the accessible side A thereof. The screw or bolt 13 which may previously be inserted through an aperture of any desired part 6 to be supported may then be threaded into the contracted threaded bore 12. As the screw 13 is threaded into the bore thread 12, the opposed ends of the nut base 10 are separated, as illustrated in Figs. 6 to 8, forcing the undercut face 16 of the barrel 11 outwardly and into engagement with the peripheral wall of the aperture 3. During this operation the intermediate portion of the longitudinal side, opposite the gap 14, reacts as a spring hinge, which acts normally to contract the expanded barrel, thus subjecting the threaded screw to tension, resisting movement thereof in an unthreading direction.

As will be apparent, both the nut and the screw are inserted from the same side A of the support, thus providing a simple and effective blind fastening installation.

Although I have illustrated and described a preferred embodiment of my invention, I do not wish to be limited thereby because the scope of my invention is best defined by the following claims.

I claim:

1. In combination with a support having a circular aperture, a nut for attachment thereto comprising an elongated flat base formed with a central tubular barrel extending from one face thereof and providing a central screw-receiving bore through said barrel, said barrel and said base being gapped from one longitudinal edge of said base to the end of said barrel, and said base being bowed longitudinally in the plane thereof providing resiliently connected barrel sections adapted to be snapped into said support aperture, said barrel sections being radially expansible by a screw threaded into said bore into locking engagement with said apertured support, and said expanded barrel sections exerting a tension on said screw thereby resisting turning movement thereof in an unthreading direction.

2. A nut installation for use with a support having a circular aperture therethrough, said nut comprising a base and a short tubular barrel extending from one face of the base and open at both ends, said base and barrel being gapped at one side only and extending from one opening in said barrel to the other, and said barrel being contracted for at least a portion thereof so that it is of a diameter to be snapped into said support aperture, said barrel having a threaded screw-receiving bore for the reception of a screw to expand the gapped barrel into locking engagement with the apertured support.

3. In combination with a support having a circular aperture, a nut for attachment thereto comprising an elongated flat base formed with a central tubular barrel extending from one face thereof and providing a central screw-receiving bore through said barrel, the outer peripheral face of said barrel being undercut from its free end toward said base to permit said barrel to be snapped into and retained in said circular aperture, said barrel and said base being gapped from one longitudinal edge of said bore to the end of said barrel thereby providing resiliently connected barrel sections adapted to be snapped into said support aperture, said barrel sections being radially expansible by a screw threaded into said bore into locking engagement with said apertured support, and said expanded barrel sections exerting a tension on said screw resisting turning movement thereof in an unthreading direction.

FRANK E. JOHNSON.